United States Patent [19]

McClave

[11] Patent Number: 5,692,333
[45] Date of Patent: Dec. 2, 1997

[54] BACK LOADING FRAMING SYSTEM

[75] Inventor: Larry W. McClave, Louisville, Ky.

[73] Assignee: Cardinal Aluminum, Louisville, Ky.

[21] Appl. No.: 476,610

[22] Filed: Jun. 7, 1995

[51] Int. Cl.[6] .................................................. G09F 1/12
[52] U.S. Cl. ................................ 40/785; 40/792; 403/403
[58] Field of Search ........................ 40/782, 785, 792, 40/795; 403/401, 402, 403, 297, 278, 281, 205

[56] References Cited

U.S. PATENT DOCUMENTS

| | | | |
|---|---|---|---|
| 2,489,477 | 11/1949 | Brecher | 40/792 |
| 3,613,279 | 10/1971 | Belfor . | |
| 3,698,114 | 10/1972 | Hirsch et al. . | |
| 3,736,684 | 6/1973 | Grad . | |
| 4,122,617 | 10/1978 | Nielsen . | |
| 4,368,584 | 1/1983 | Logan . | |
| 4,547,986 | 10/1985 | Sherman . | |
| 4,718,184 | 1/1988 | Sherman . | |
| 4,859,112 | 8/1989 | Nakayama | 40/782 |
| 5,050,324 | 9/1991 | Casull | 40/785 X |
| 5,187,886 | 2/1993 | Wu et al. | 40/782 X |
| 5,479,733 | 1/1996 | Kusina | 40/785 |

FOREIGN PATENT DOCUMENTS

| | | |
|---|---|---|
| 980116 | 12/1975 | Canada . |
| 2127320 | 10/1972 | France . |
| 2349308 | 4/1976 | France . |
| 2094535 | 9/1982 | United Kingdom . |
| SE8400087 | 11/1984 | WIPO . |

*Primary Examiner*—Brian K. Green
*Attorney, Agent, or Firm*—Middleton & Reutlinger; John F. Salazar

[57] ABSTRACT

A multi-piece back loading framing system is disclosed. Each frame member has bevelled ends for forming mitered joints, a front face and side portion. The frame sections have a first hardware receiving channel directly below the front face and a second hardware receiving channel adjacent the side portion. The frame sections may be joined at mitered joints using an L-shaped screw corner key in the first channel or an L-shaped crimp corner key bracket in the second channel.

6 Claims, 7 Drawing Sheets

BACK LOADING FRAMING SYSTEM

BACKGROUND OF THE INVENTION

1. Field of the Invention

The present invention relates to a back loading framing system which allows for joining of corners of framing section pieces using two alternative joining channels.

2. Discussion of the Prior Art

Multi-piece framing systems are generally well known in the prior art. Typically multiple frame sections are joined together at mitered corners by hardware inserted into a single channel formed within said each section. U.S. Pat. No. 4,718,184 teaches a picture frame corner joining system wherein a picture frame section is joined to an adjacent section via a singular channel using an L-shaped bracket having tapped screw holes in each leg, said screw upon turning forcing the L-shaped bracket against the outer edges of the channel thereby sufficiently joining the corners together. U.S. Pat. No. 4,547,986 teaches a framing system having a plurality of elongated frame sections joined end-to-end forming an enclosed displayed area and having an inset channel wherein an L-shaped bracket having cam locking mechanisms are inserted thereby securely joining the sections together. None of the prior art however provide for a framing system which allows for joining multiple frame sections together using alterative hardware receiving channels formed within the frame sections. Additionally, none of the prior art teaches a framing system having a hardware channel formed in the frame face.

SUMMARY OF THE INVENTION

The present invention is for a back loading framing system comprising a plurality of frame sections, each of said frame sections having means for securing adjoining frame sections together along a mitered joint using a first channel, means for securing said frame sections along a mitered joint using a second alternative second channel, as well as means for holding display material in place within said framing system.

More particularly, the present invention comprises is a unique back loading framing system that allows for joining of 45° mitered corners by two different methods. The framing section pieces of the present invention have two separate channels for receiving joining or bracket hardware. The first channel is located directly below the front face portion of the frame. The first leg of a L-shaped corner key bracket is inserted into said first channel along a horizontal plane. The second leg of said L-shaped bracket is inserted into the first channel of an adjacent frame section. The bracket is then tightened into place using a screw compression method. Alternatively, the frame sections may be joined via a second channel located along the lateral side of the frame section. Said second channel receives the first leg of an L-shaped crimped corner key bracket along a vertical plane. The second leg of said L-shaped crimped corner bracket is inserted into a second adjacent frame section via the second channel of said second framing section. The frame sections are held into place by compression of a crimping head at the joined corner thus causing indentations on the lips of the second channel which extend into notches located on the crimped corner key bracket thereby securely affixing the corner key within the second channel of both adjoining frame sections.

Finally, the present invention comprises a plurality of frame sections having an outwardly extending curved face portion and a flat side portion and joined at mitered corners, each of said frame sections having a first channel extending longitudinally along said section and comprises of two upper contact surfaces having a concave base portion extending therebetween and an inner and outer inwardly extending lip forming the lower contact surfaces and corresponding to and spaced apart from said two upper contact surfaces, a second channel extending longitudinally along said section and perpendicular to said first channel, said second channel comprises of an outer contact surface formed by the inner surface of said flat side portion and two inwardly extending lips forming the inner contact surface and spaced apart from said outer contact surface, securing means which forms said mitered corners, and retaining means for holding said display material inserted into said framing system in place.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
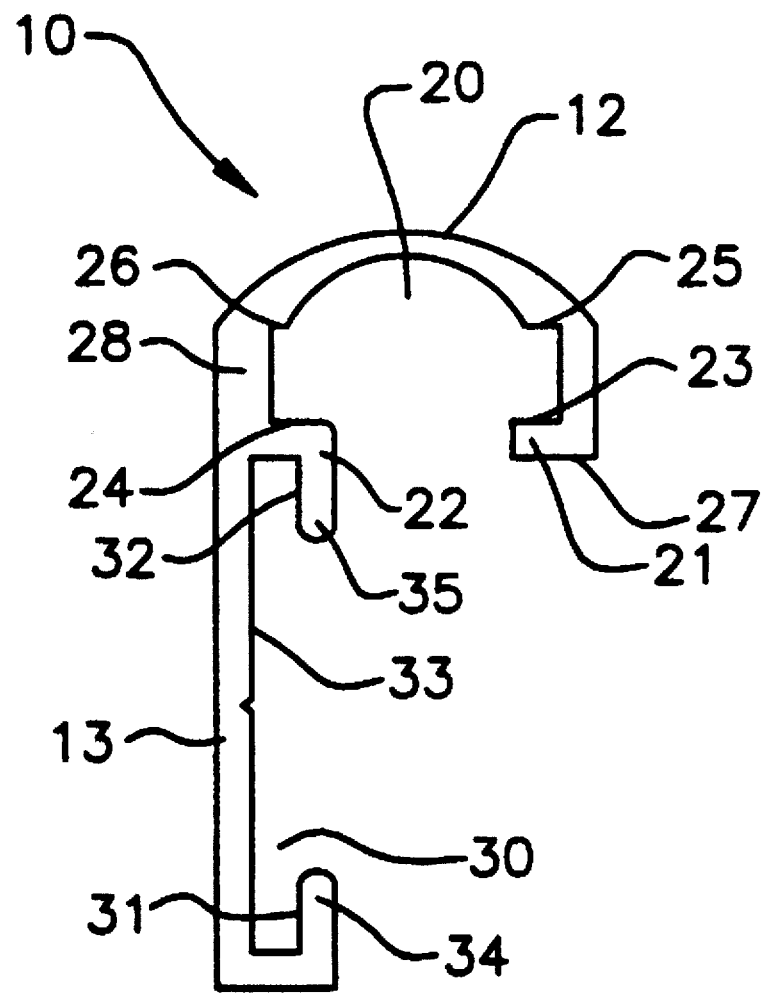
FIG. 1 is a cut away side view of the frame section piece of the present invention.

Referring now to FIG. 1 wherein a side view of the frame section of the present invention is shown. Each framing section is comprised of an outwardly extending curved face 12 which is located directly above a first channel 20 which receives a first leg of an L-shaped base plate 40 and L-shaped screw plate 42 shown in FIG. 8 and FIG. 9. Each frame is formed at both ends with 45° mitered corners which may be joined and affixed into place using said first channel. The frame section shown in FIG. 1 also has a second channel 30 for receiving in a vertical plane the first leg of a crimped corner key 50 shown in FIG. 10.

Figure 2:
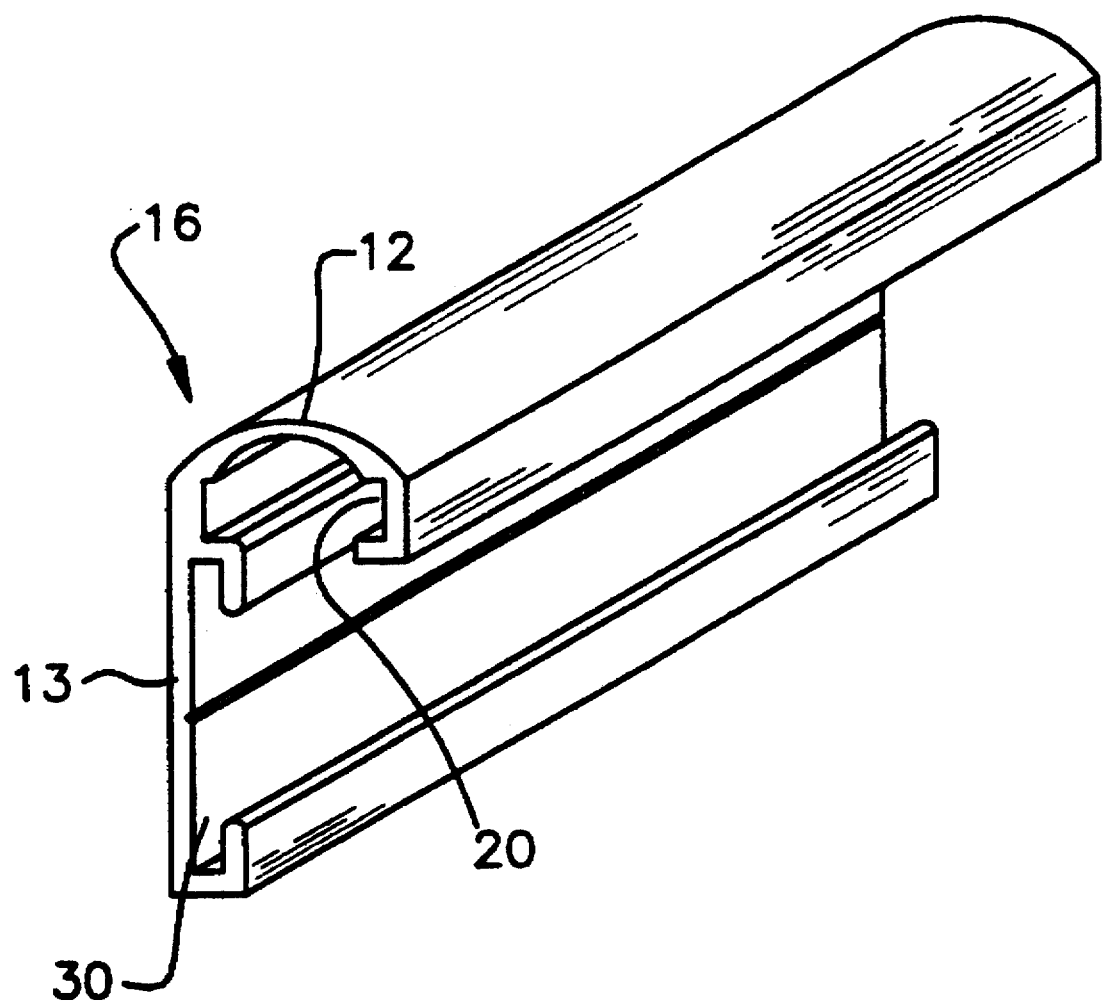
FIG. 2 is perspective view of a singular frame section.
Figure 3:
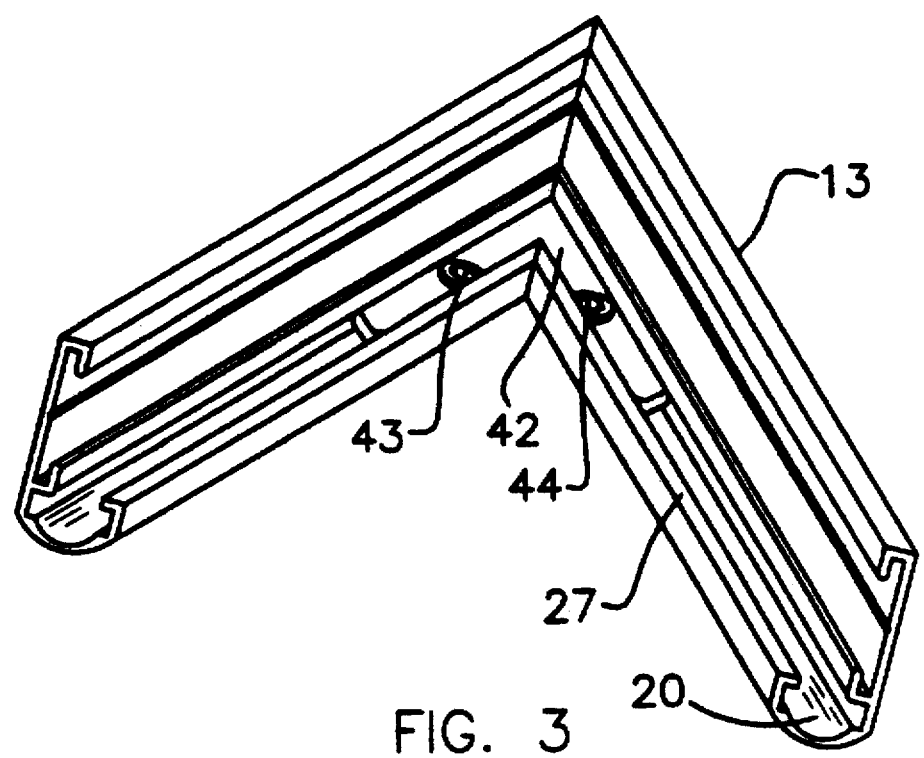
FIG. 3 is a perspective view of the screw hinge bracket section.
Figure 4:
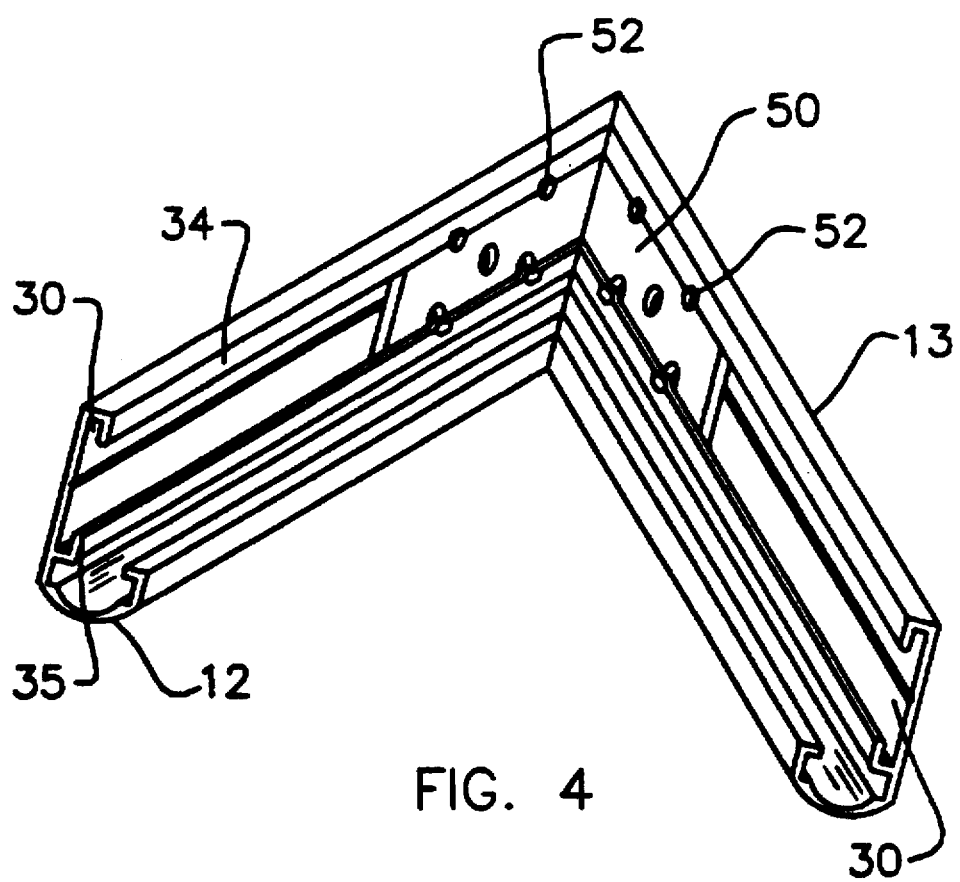
FIG. 4 is a perspective view of two sections joined by the crimping corner key.

The end 16, shown in FIG. 2, of each frame section is beveled to form a mitered joint thereby forming a 90° corner when two frame sections are joined together. Frame sections are beveled at 45° angles to form a tight joint along curved front face joined sections so that little or no joint displacement is visible.

Figure 7:
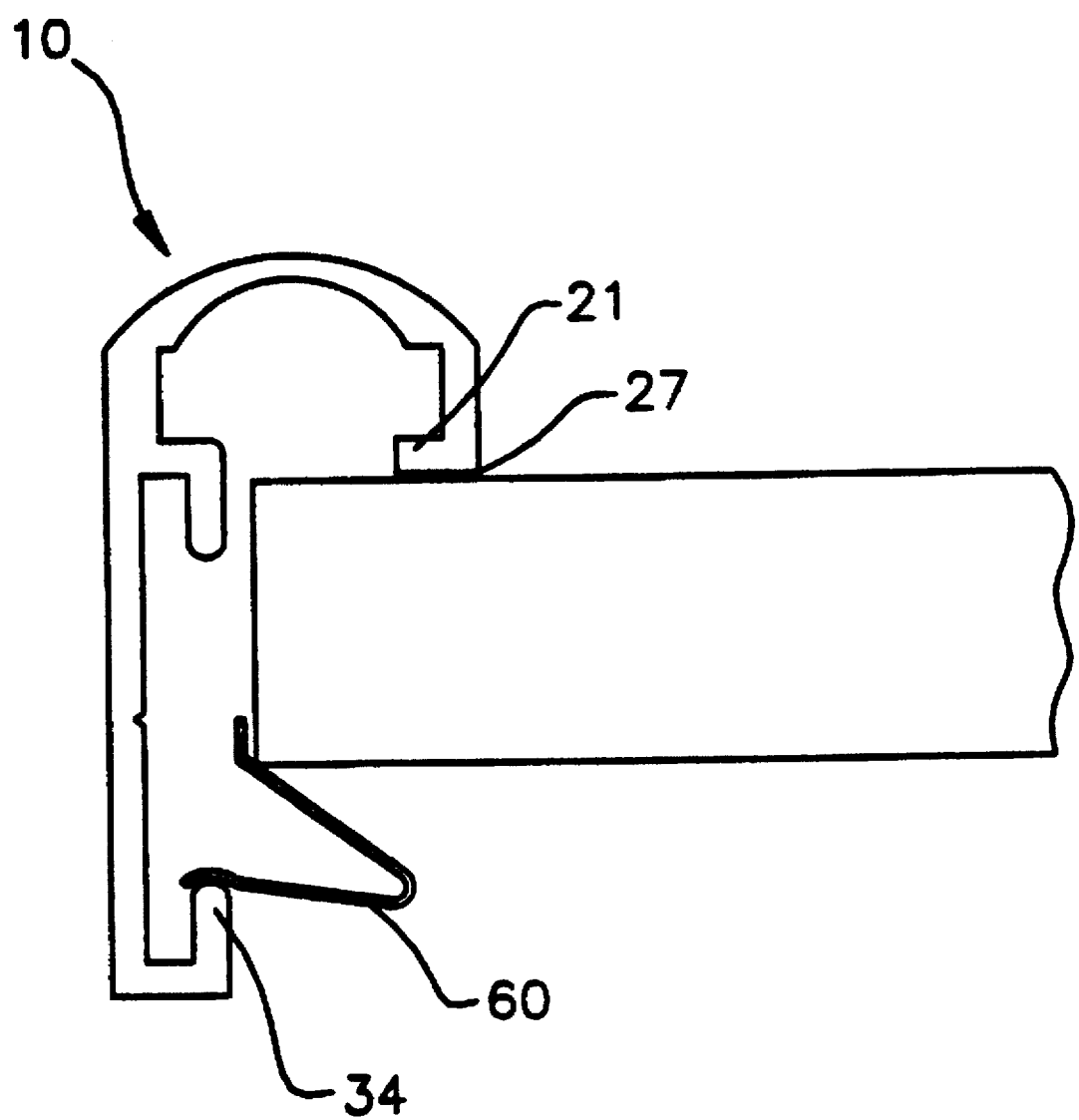
FIG. 7 is a frontal view of the bracket of the framing section of the present invention showing spring clips and displayed material.

Returning to FIG. 1, first channel 20 is comprised on the inner side of outwardly longitudinally extending curved faced portion 12 which forms at its ends lateral runners 25 and 26 longitudinally extending the length of the frame section and forming an upper contact surface. Said first channel additionally has along its lower surface inwardly extending lips 21 and 22 which form the longitudinally extending lower contact surfaces of said first channel, 23 24. Inwardly extending lips 21 and 22 form the lower support surface for inserted hardware material which secure joined frame sections. Lip 21 comprises an inner inwardly extending lip of said first channel and lip 22 comprises the outer inwardly extending lip of said first channel. The bottom surface 27 of said inner inwardly extending lip 21 provides a contact surface for displayed material which is inserted into said framing system, as shown in FIG. 7.

Figure 10:
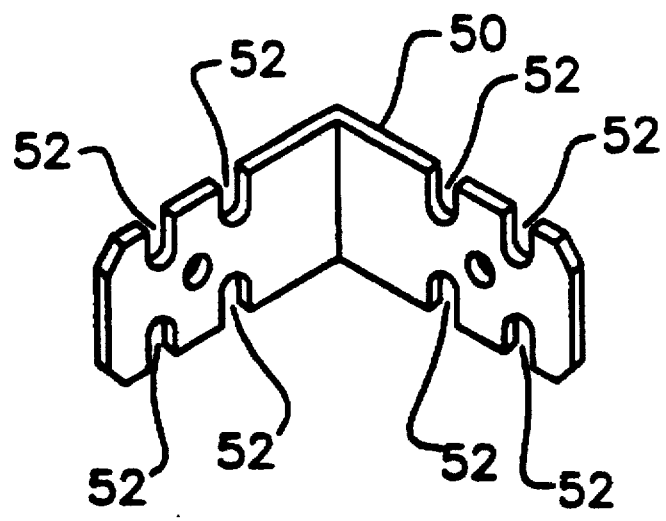
FIG. 10 is an L-shaped crimp corner key bracket.

Framing section 10 additionally has a second channel 30 for receiving along a vertical plane a crimped corner key bracket 50, shown in FIG. 10, which allows two adjacent sections of frame to be joined via a crimping head. The second channel 30 of frame section 10 follows along flat side portion 13. The inner surface 33 of flat side portion 13 forms the outer contact surface on said second channel. Second channel 30 also has inwardly extending lips 34 and 35 which have interior faces 31 and 32, respectively. Lips 34 and 35 provide the inner contact surfaces of said second channel. Second channel 30 is formed along a vertical plane and receives crimp corner key bracket 50 shown in FIG. 10 which has located on its sides notches 52 thereby allowing inwardly extending lips 34 and 35 of said second channel to be slightly crimped into said notches 52 thereby securing said crimped corner key bracket 50 within said second channel.

The framing system of the present invention allows all four sides of the picture frame system to be assembled along mitered joints, each of said joints is free from gaping which thereby diminishes the quality of the overall frame. Once assembled, the back loading framing system of the present invention allows for insertion of display material which may be held into place using spring clip 60 shown in FIG. 7 which urges said displayed material forward against surface 27 formed by lip 21. Spring clip 60 utilizes lip 34 as a support member in order that said displayed material may be urged forward against said contact surface 27.

Frame section 10 of the present invention is generally made of an extruded aluminum. The first horizontal channel and second vertical channel must be at a proper perpendicular angle thereby insuring that the joints formed between adjacent frame sections contain no gapping which would diminish the quality of the overall frame. Therefore, side wall 28 as shown in FIG. 1 requires an extra wall thickness of about 0.010 inches over the thickness of the wall forming flat side portion 13 in order to prevent extrusion bending which causes outward curve surface 12 to bend inward towards the second channel formed by flat side portion 13 thereby forming an angle between said first channel and said second channel of less than 90°. Added material formed at wall 28 forces the extruded frame section to remain at the proper 90° angle.

Figure 5:
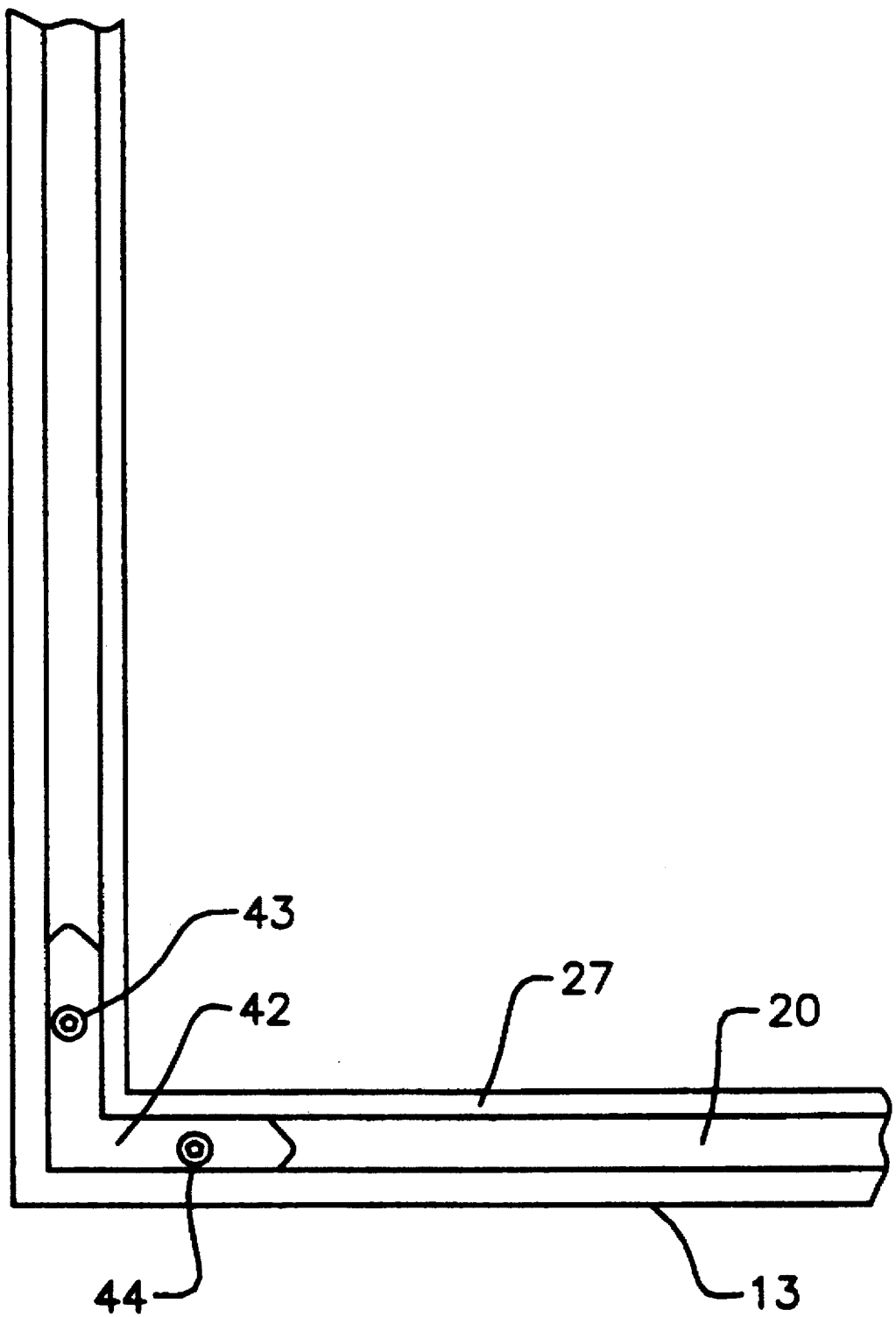
FIG. 5 is a rear view of two joined framing sections using the first channel for the framing section of the present invention.
Figure 8:
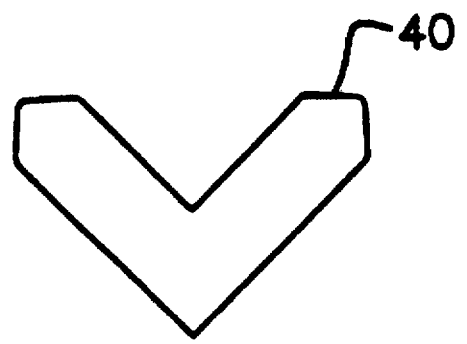
FIG. 8 is an L-shaped base plate.
Figure 9:
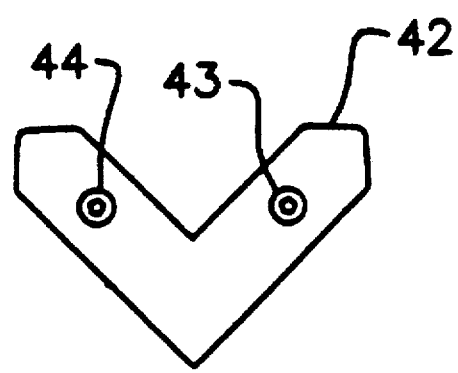
FIG. 9 is an L-shaped screw plate.

In joining adjacent frame sections utilizing said first channel 20, as shown in FIG. 5, L-shaped base plate 40 shown in FIG. 8 is inserted into first channel 20 along upper contact surfaces 25 and 26. Below said L-shaped base plate 40, L-shaped screw plate 42 is inserted with the screw heads directed downward towards said second channel so that said screw heads may be readily accessible for tightening. Upon tightening of screws 43 and 44, L-shaped base plate 40 is forced against upper contact surfaces 25 and 26 and L-shaped screw plate 42 is forced downward against lower contact surfaces 23 and 24 of said first channel. By providing for the L-shaped base plate 40, pressure exerted by screws 43 and 44 is distributed evenly along the entire leg of said L-shaped base plate thereby preventing indentation into the softer aluminum frame material which frame section 10 is made of. Alternatively, L-shaped screw plate 42 may be inserted into said first channel 20 singularly thereby causing screws 43 and 44 to press directly against the inner side of outward longitudinally extending curve face portion 12. However, due to the amount of pressure exerted by a screw at a single point on said inner surface, pitting or denting may occur and may be visible on outer curved face portion 12. Therefore, it is preferable to utilize L-shaped base plate for even distribution of exerted force. Once adjacent frame sections are connected using L-shaped screw plate 42, as shown in FIG. 5, display material may be back loaded so that said material rests upon support runner 27.

L-shaped screw plate 42 will typically have a 10/32 inch socket head-set screw. This is beneficial because it is preferable that the screw have no head which may extend below lip 21 thereby interfering with any inserted displayed material resting upon surface 27. Additionally, by providing for this type of screw, a socketed screw provides for easier rotation than an ordinary slotted type screw.

Figure 6:
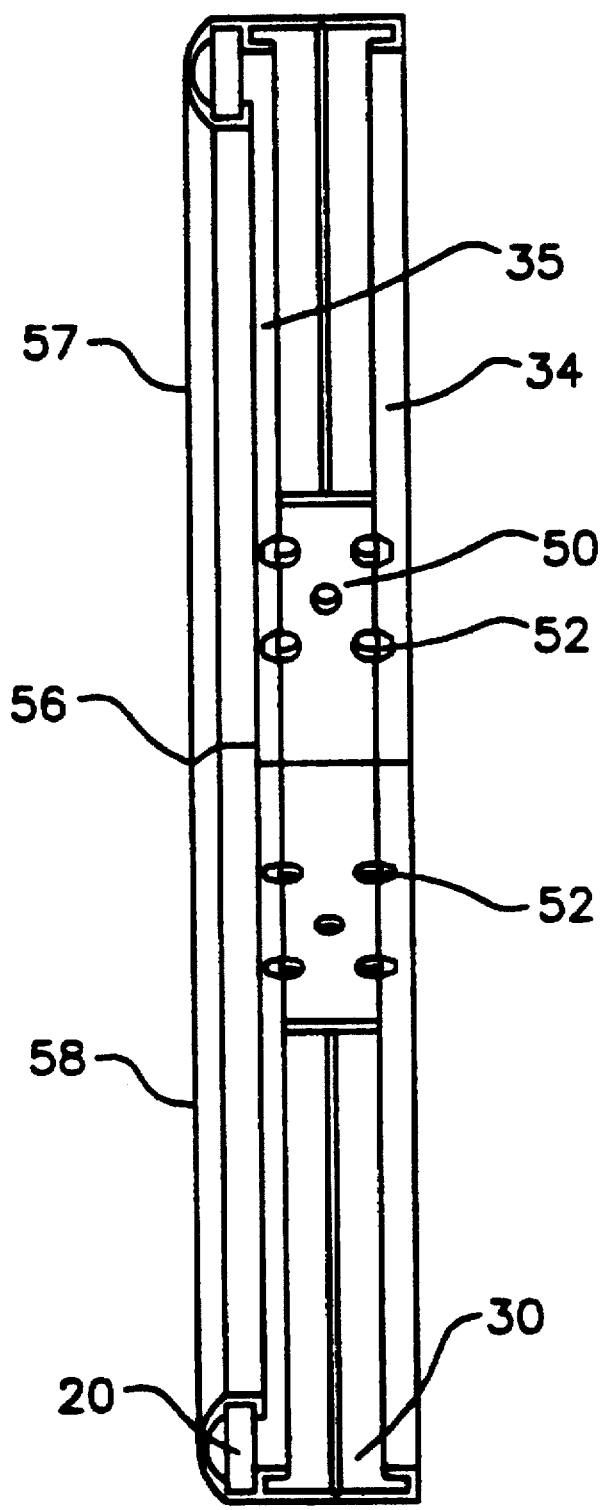
FIG. 6 is a side view of two joined framing sections using the second channel of the bracket of the present invention.

Assembly of the back loading framing system utilizing said second channel 30 consists of joining all four corners utilizing crimp corner key bracket 50 shown in FIG. 10 thus making a loose four-sided framing shell. Each corner of said framing shell is then crimped by a crimping head or by staking which forces the softer metal of the extruded frame section, namely inwardly extending lips 34 and 35 into crimp notches 52 located on crimp corner key bracket 50. However, utilizing crimp corner key bracket 50 to join the frame sections forms a permanent joint between adjacent frame sections thereby preventing subsequent disassembly which would be allowed when using the first channel 20 and L-shaped screw plate 42 with L-shaped base plate 40. As shown in FIG. 6, two adjacent frame members are joined using crimp corner key bracket 50 which is inserted into the second channel of two joined frame sections. Channel returns 34 and 35 are compressed into crimp notches 52 of crimp corner key 50. A 90° angle is formed at joint 56, mitered joint 56 showing no visible gapping between separate sections 57 and 58.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A back loading framing system comprising:

a plurality of longitudinally extending frame sections joined end to end, each of said frame sections beveled at each end and having:

an outwardly extending face;

a corresponding side wall extending downwardly from said face in an L shaped fashion;

a first channel formed directly below said outwardly extending face having a first and second longitudinally extending upper contact surface, a first and second longitudinally extending lower contact surface and opposing side walls therebetween;

a second channel formed perpendicular to said first channel and having an outer contact surface, said side wall forming said outer contact surface of said second channel and also having an inner contact surface comprised of longitudinally extending lips spaced apart a predetermined distance from said side wall;

means for securing said adjacent frame sections at said beveled ends;

means for holding in place display material inserted into said framing system;

wherein said means for securing said adjacent sections at said beveled ends comprises an L-shaped corner key, said L-shaped corner key having two legs joined at an angle matching said beveled ends, each of said legs inserted within said first channel of said joined frame sections and having a tapped screw hole for receiving a screw.

2. The framing system of claim 1 wherein said screw is a socket headset screw.

3. The framing system of claim 1 wherein said L shaped corner key further comprises:

a flat L-shaped base plate, said base plate having two legs joined at an angle matching said beveled ends, each of said legs inserted within said first channel of said frame sections and compressed against said first and second longitudinally extending upper contact surfaces of said first channel;

an L-shaped corner key having two legs joined at an angle matching said beveled ends and having tapped screw holes for receiving a first and a second screw in said legs, said legs of said L-shaped corner key inserted below said flat L-shaped base plate and compressed against said first and second longitudinally extending lower contact surface of said first channel;

whereby when said first and second screws of said L-shaped corner key are turned clockwise, said L-shaped based plate compresses against said upper contact surfaces and said L-shaped corner key compresses against said lower contact surfaces thereby securely affixing said adjacent frame sections together.

4. A back loading framing system comprising:

a plurality of frame sections having an outwardly extending curved face portion, said curved face portion having an underside, and a side wall portion extending downward therefrom and joined at beveled ends, each of said frame sections having:

(a) a first channel extending directly below said curved face portion, said first channel comprised of lower contact surfaces, and two flat upper contact surfaces having a concave portion extending therebetween, said concave portion forming said underside of said curved face portion, and inner and outer inwardly extending lips forming said lower contact surfaces and corresponding to and spaced apart from said two upper contact surfaces;

(b) a second channel perpendicular to said first channel and having an outer contact surface formed by said side wall portion and having two inner contact surfaces formed by two inwardly extending lips, said lips spaced apart from said outer contact surface by a predetermined distance;

means for securing adjacent frame sections at said beveled end;

means for retaining display material inserted into said framing system;

wherein said means for securing adjacent frame sections is further comprised of:

a flat L-shaped base plate, said L-shaped base plate having two legs joined at an angle matching said joined beveled ends, each of said legs inserted within said first channel of said adjacent frame sections and compressed against said upper contact surfaces of said first channel;

an L-shaped corner key having two legs joined at an angle matching said joined beveled ends and having first and second tapped screw holes for receiving a first and a second screw in each of said legs, said legs of said L-shaped corner key inserted below said L-shaped base plate and compressed against said lower contact surfaces of said first channel;

whereby when said first and second screws of said L-shaped corner key are turned, said L-shaped base plate compresses against said upper contact surfaces of said first channel and said L-shaped corner key compresses against said lower contact surfaces of said first channel thereby securely affixing said adjacent frame sections together.

5. The framing system of claim 4 wherein said first and second screws are socket head set screws.

6. A back loading framing system comprising:

a plurality of frame sections, each of said frame sections having an outwardly extending curved face portion, a side wall and beveled ends, adjacent pairs of said frame sections joined at said beveled ends to form a mitered joint, each of said frame sections further having:

(a) a first channel extending longitudinally along said frame section and comprised of two upper contact surfaces having a concave face portion extending therebetween and an inner and outer inwardly extending lip forming two lower contact surfaces corresponding to and spaced apart from said two upper contact surfaces;

b) a second channel extending longitudinally adjacent to said side wall and perpendicular to said first channel, said second channel comprised of an outer contact surface formed by said side wall and two inwardly extending lips forming an inner contact surface spaced apart from said outer contact surface;

a flat L-shaped base plate, said base plate having two legs joined at an angle matching said joined beveled ends, each of said legs inserted within said first channel of said frame sections and compressed against said upper contact surfaces of said first channel;

an L-shaped corner key having two legs joined at an angle matching said joined beveled ends and having first and second tapped screw holes for receiving a first and second screw in each of said legs, said legs of said L-shaped corner key inserted below said L-shaped base plate and compressed against said lower contact surfaces of said first channel;

whereby when said first and second screws of said L-shaped corner key are turned, said L-shaped base plate compresses against said upper contact surfaces of said first channel and said L-shaped corner key compresses against said lower contact surfaces of said first channel thereby securely affixing said adjacent frame sections forming said joined beveled ends; and, a plurality of spring clips.

* * * * *